(12) United States Patent
Guard

(10) Patent No.: US 8,917,261 B2
(45) Date of Patent: Dec. 23, 2014

(54) PIXEL OCCLUSION MITIGATION

(75) Inventor: David Brent Guard, Southampton (GB)

(73) Assignee: Atmel Corporation, San Jose, CA (US)

( * ) Notice: Subject to any disclaimer, the term of this patent is extended or adjusted under 35 U.S.C. 154(b) by 211 days.

(21) Appl. No.: 13/533,771

(22) Filed: Jun. 26, 2012

(65) Prior Publication Data
US 2013/0342472 A1 Dec. 26, 2013

(51) Int. Cl.
*G06F 3/042* (2006.01)
(52) U.S. Cl.
USPC .......................................... 345/175; 345/174
(58) Field of Classification Search
CPC ....... G06F 3/041; G06F 3/042; G06F 3/0421; G06F 3/044; G06F 2203/04102; G06F 2203/04104; G06F 2203/04106
USPC ................... 345/173–179; 178/18.01–18.09, 178/20.01–20.04
See application file for complete search history.

(56) References Cited

U.S. PATENT DOCUMENTS

| | | | |
|---|---|---|---|
| 7,663,607 B2 | 2/2010 | Hotelling | |
| 7,875,814 B2 | 1/2011 | Chen | |
| 7,920,129 B2 | 4/2011 | Hotelling | |
| 8,031,094 B2 | 10/2011 | Hotelling | |
| 8,031,174 B2 | 10/2011 | Hamblin | |
| 8,040,326 B2 | 10/2011 | Hotelling | |
| 8,049,732 B2 | 11/2011 | Hotelling | |
| 8,179,381 B2 | 5/2012 | Frey | |
| 8,284,332 B2* | 10/2012 | Geaghan et al. ................. | 349/12 |
| 8,531,410 B2* | 9/2013 | Roth et al. ..................... | 345/173 |
| 2009/0219258 A1* | 9/2009 | Geaghan et al. .............. | 345/173 |
| 2009/0315854 A1 | 12/2009 | Matsuo | |
| 2012/0242588 A1 | 9/2012 | Myers | |
| 2012/0242592 A1 | 9/2012 | Rothkopf | |
| 2012/0243151 A1 | 9/2012 | Lynch | |
| 2012/0243719 A1 | 9/2012 | Franklin | |
| 2013/0076612 A1 | 3/2013 | Myers | |
| 2013/0321668 A1* | 12/2013 | Kamath ........................ | 348/239 |

FOREIGN PATENT DOCUMENTS

WO WO 2012/129247 9/2012

OTHER PUBLICATIONS

U.S. Appl. No. 61/454,936, filed Mar. 21, 2011, Myers.
U.S. Appl. No. 61/454,950, filed Mar. 21, 2011, Lynch.
U.S. Appl. No. 61/454,894, filed Mar. 21, 2011, Rothkopf.

\* cited by examiner

*Primary Examiner* — Vijay Shankar
(74) *Attorney, Agent, or Firm* — Baker Botts LLP

(57) ABSTRACT

In one embodiment, a method includes determining output modifications to apply to pixels of a display based on a modification map for pixels of the display. The modification map provides output-modification values for the pixels to mitigate optical occlusion of pixels of the display optically occluded by micro-features of a touch sensor overlying the display relative to other pixels of the display not optically occluded by micro-features of the touch sensor. The method also includes applying the output modifications to pixels of the display to mitigate their optical occlusion relative to other pixels of the display not optically occluded by micro-features of the touch sensor.

20 Claims, 4 Drawing Sheets

PIXEL OCCLUSION MITIGATION

TECHNICAL FIELD

This disclosure generally relates to electronic displays.

BACKGROUND

A touch sensor may detect the presence and location of a touch or the proximity of an object (such as a user's finger or a stylus) within a touch-sensitive area of the touch sensor overlaid on a display screen, for example. In a touch-sensitive-display application, the touch sensor may enable a user to interact directly with what is displayed on the screen, rather than indirectly with a mouse or touch pad. A touch sensor may be attached to or provided as part of a desktop computer, laptop computer, tablet computer, personal digital assistant (PDA), smartphone, satellite navigation device, portable media player, portable game console, kiosk computer, point-of-sale device, or other suitable device. A control panel on a household or other appliance may include a touch sensor.

There are a number of different types of touch sensors, such as (for example) resistive touch screens, surface acoustic wave touch screens, and capacitive touch screens. Herein, reference to a touch sensor may encompass a touch screen, and vice versa, where appropriate. When an object touches or comes within proximity of the surface of the capacitive touch screen, a change in capacitance may occur within the touch screen at the location of the touch or proximity. A touch-sensor controller may process the change in capacitance to determine its position on the touch screen.

DESCRIPTION OF EXAMPLE EMBODIMENTS

Figure 1:
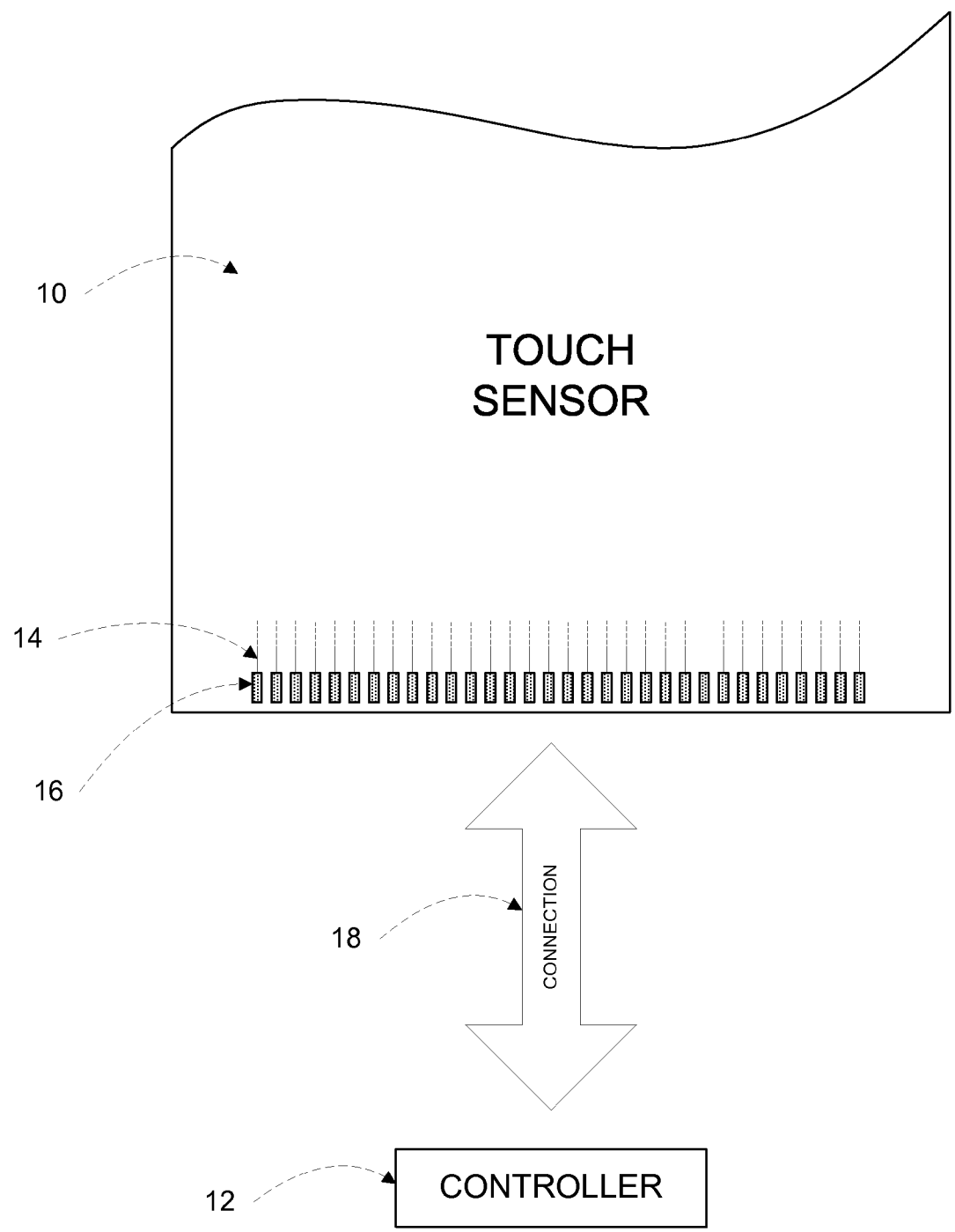
FIG. 1 illustrates an example touch sensor with an example controller.

FIG. 1 illustrates an example touch sensor 10 with an example touch-sensor controller 12. Touch sensor 10 and touch-sensor controller 12 may detect the presence and location of a touch or the proximity of an object within a touch-sensitive area of touch sensor 10. Herein, reference to a touch sensor may encompass both the touch sensor and its touch-sensor controller, where appropriate. Similarly, reference to a touch-sensor controller may encompass both the touch-sensor controller and its touch sensor, where appropriate. Touch sensor 10 may include one or more touch-sensitive areas, where appropriate. Touch sensor 10 may include an array of drive and sense electrodes (or an array of electrodes of a single type) disposed on one or more substrates, which may be made of a dielectric material. Herein, reference to a touch sensor may encompass both the electrodes of the touch sensor and the substrate(s) that they are disposed on, where appropriate. Alternatively, where appropriate, reference to a touch sensor may encompass the electrodes of the touch sensor, but not the substrate(s) that they are disposed on.

An electrode (whether a ground electrode, a guard electrode, a drive electrode, or a sense electrode) may be an area of conductive material forming a shape, such as for example a disc, square, rectangle, thin line, other suitable shape, or suitable combination of these. One or more cuts in one or more layers of conductive material may (at least in part) create the shape of an electrode, and the area of the shape may (at least in part) be bounded by those cuts. In particular embodiments, the conductive material of an electrode may occupy approximately 100% of the area of its shape. As an example and not by way of limitation, an electrode may be made of indium tin oxide (ITO) and the ITO of the electrode may occupy approximately 100% of the area of its shape (sometimes referred to as 100% fill), where appropriate. In particular embodiments, the conductive material of an electrode may occupy substantially less than 100% of the area of its shape. As an example and not by way of limitation, an electrode may be made of fine lines of metal or other conductive material (FLM), such as for example copper, silver, or a copper- or silver-based material, and the fine lines of conductive material may occupy approximately 5% of the area of its shape in a hatched, mesh, or other suitable pattern. Herein, reference to FLM encompasses such material, where appropriate. Although this disclosure describes or illustrates particular electrodes made of particular conductive material forming particular shapes with particular fill percentages having particular patterns, this disclosure contemplates any suitable electrodes made of any suitable conductive material forming any suitable shapes with any suitable fill percentages having any suitable patterns.

Where appropriate, the shapes of the electrodes (or other elements) of a touch sensor may constitute in whole or in part one or more macro-features of the touch sensor. One or more characteristics of the implementation of those shapes (such as, for example, the conductive materials, fills, or patterns within the shapes) may constitute in whole or in part one or more micro-features of the touch sensor. One or more macro-features of a touch sensor may determine one or more characteristics of its functionality, and one or more micro-features of the touch sensor may determine one or more optical features of the touch sensor, such as transmittance, refraction, or reflection.

A mechanical stack may contain the substrate (or multiple substrates) and the conductive material forming the drive or sense electrodes of touch sensor 10. As an example and not by way of limitation, the mechanical stack may include a first layer of optically clear adhesive (OCA) beneath a cover panel. The cover panel may be clear and made of a resilient material suitable for repeated touching, such as for example glass, polycarbonate, or poly(methyl methacrylate) (PMMA). This disclosure contemplates any suitable cover panel made of any suitable material. The first layer of OCA may be disposed between the cover panel and the substrate with the conductive material forming the drive or sense electrodes. The mechanical stack may also include a second layer of OCA and a dielectric layer (which may be made of PET or another suitable material, similar to the substrate with the conductive material forming the drive or sense electrodes). As an alternative, where appropriate, a thin coating of a dielectric material may be applied instead of the second layer of OCA and the dielectric layer. The second layer of OCA may be disposed between the substrate with the conductive material making up the drive or sense electrodes and the dielectric layer, and the dielectric layer may be disposed between the second layer of OCA and an air gap to a display of a device including touch sensor 10 and touch-sensor controller 12. As an example only and not by way of limitation, the cover panel may have a thickness of approximately 1 mm; the first layer of OCA may have a thickness of approximately 0.05 mm; the substrate with the conductive material forming the drive or sense electrodes may have a thickness of approximately 0.05 mm; the second layer of OCA may have a thickness of approximately 0.05 mm; and the dielectric layer may have a thickness of approximately 0.05 mm. Although this disclosure describes a particular mechanical stack with a particular number of particular layers made of particular materials and having particular thicknesses, this disclosure contemplates any suitable mechanical stack with any suitable number of any suitable layers made of any suitable materials and having any suitable thicknesses. As an example and not by way of limitation, in particular embodiments, a layer of adhesive or dielectric may replace the dielectric layer, second layer of OCA, and air gap described above, with there being no air gap to the display.

One or more portions of the substrate of touch sensor 10 may be made of polyethylene terephthalate (PET) or another suitable material. This disclosure contemplates any suitable substrate with any suitable portions made of any suitable material. In particular embodiments, the drive or sense electrodes in touch sensor 10 may be made of ITO in whole or in part. In particular embodiments, the drive or sense electrodes in touch sensor 10 may be made of fine lines of metal or other conductive material. As an example and not by way of limitation, one or more portions of the conductive material may be copper or copper-based and have a thickness of approximately 5 μm or less and a width of approximately 10 μm or less. As another example, one or more portions of the conductive material may be silver or silver-based and similarly have a thickness of approximately 5 μm or less and a width of approximately 10 μm or less. This disclosure contemplates any suitable electrodes made of any suitable material.

Touch sensor 10 may implement a capacitive form of touch sensing. In a mutual-capacitance implementation, touch sensor 10 may include an array of drive and sense electrodes forming an array of capacitive nodes. A drive electrode and a sense electrode may form a capacitive node. The drive and sense electrodes forming the capacitive node may come near each other, but not make electrical contact with each other. Instead, the drive and sense electrodes may be capacitively coupled to each other across a space between them. A pulsed or alternating voltage applied to the drive electrode (by touch-sensor controller 12) may induce a charge on the sense electrode, and the amount of charge induced may be susceptible to external influence (such as a touch or the proximity of an object). When an object touches or comes within proximity of the capacitive node, a change in capacitance may occur at the capacitive node and touch-sensor controller 12 may measure the change in capacitance. By measuring changes in capacitance throughout the array, touch-sensor controller 12 may determine the position of the touch or proximity within the touch-sensitive area(s) of touch sensor 10.

In a self-capacitance implementation, touch sensor 10 may include an array of electrodes of a single type that may each form a capacitive node. When an object touches or comes within proximity of the capacitive node, a change in self-capacitance may occur at the capacitive node and touch-sensor controller 12 may measure the change in capacitance, for example, as a change in the amount of charge needed to raise the voltage at the capacitive node by a pre-determined amount. As with a mutual-capacitance implementation, by measuring changes in capacitance throughout the array, touch-sensor controller 12 may determine the position of the touch or proximity within the touch-sensitive area(s) of touch sensor 10. This disclosure contemplates any suitable form of capacitive touch sensing, where appropriate.

In particular embodiments, one or more drive electrodes may together form a drive line running horizontally or vertically or in any suitable orientation. Similarly, one or more sense electrodes may together form a sense line running horizontally or vertically or in any suitable orientation. In particular embodiments, drive lines may run substantially perpendicular to sense lines. Herein, reference to a drive line may encompass one or more drive electrodes making up the drive line, and vice versa, where appropriate. Similarly, reference to a sense line may encompass one or more sense electrodes making up the sense line, and vice versa, where appropriate.

Touch sensor 10 may have drive and sense electrodes disposed in a pattern on one side of a single substrate. In such a configuration, a pair of drive and sense electrodes capacitively coupled to each other across a space between them may form a capacitive node. For a self-capacitance implementation, electrodes of only a single type may be disposed in a pattern on a single substrate. In addition or as an alternative to having drive and sense electrodes disposed in a pattern on one side of a single substrate, touch sensor 10 may have drive electrodes disposed in a pattern on one side of a substrate and sense electrodes disposed in a pattern on another side of the substrate. Moreover, touch sensor 10 may have drive electrodes disposed in a pattern on one side of one substrate and sense electrodes disposed in a pattern on one side of another substrate. In such configurations, an intersection of a drive electrode and a sense electrode may form a capacitive node. Such an intersection may be a location where the drive electrode and the sense electrode "cross" or come nearest each other in their respective planes. The drive and sense electrodes do not make electrical contact with each other—instead they are capacitively coupled to each other across a dielectric at the intersection. Although this disclosure describes particular configurations of particular electrodes forming particular nodes, this disclosure contemplates any suitable configuration of any suitable electrodes forming any suitable nodes. Moreover, this disclosure contemplates any suitable electrodes disposed on any suitable number of any suitable substrates in any suitable patterns.

As described above, a change in capacitance at a capacitive node of touch sensor 10 may indicate a touch or proximity input at the position of the capacitive node. Touch-sensor controller 12 may detect and process the change in capacitance to determine the presence and location of the touch or proximity input. Touch-sensor controller 12 may then communicate information about the touch or proximity input to one or more other components (such one or more central processing units (CPUs)) of a device that includes touch sensor 10 and touch-sensor controller 12, which may respond to the touch or proximity input by initiating a function of the device (or an application running on the device). Although this disclosure describes a particular touch-sensor controller having particular functionality with respect to a particular device and a particular touch sensor, this disclosure contemplates any suitable touch-sensor controller having any suitable functionality with respect to any suitable device and any suitable touch sensor.

Touch-sensor controller 12 may be one or more integrated circuits (ICs), such as for example general-purpose microprocessors, microcontrollers, programmable logic devices or arrays, application-specific ICs (ASICs). In particular embodiments, touch-sensor controller 12 comprises analog circuitry, digital logic, and digital non-volatile memory. In particular embodiments, touch-sensor controller 12 is disposed on a flexible printed circuit (FPC) bonded to the substrate of touch sensor 10, as described below. The FPC may be active or passive, where appropriate. In particular embodiments, multiple touch-sensor controllers 12 are disposed on the FPC. Touch-sensor controller 12 may include a processor unit, a drive unit, a sense unit, and a storage unit. The drive unit may supply drive signals to the drive electrodes of touch sensor 10. The sense unit may sense charge at the capacitive nodes of touch sensor 10 and provide measurement signals to the processor unit representing capacitances at the capacitive nodes. The processor unit may control the supply of drive signals to the drive electrodes by the drive unit and process measurement signals from the sense unit to detect and process the presence and location of a touch or proximity input within the touch-sensitive area(s) of touch sensor 10. The processor unit may also track changes in the position of a touch or proximity input within the touch-sensitive area(s) of touch sensor 10. The storage unit may store programming for execution by the processor unit, including programming for controlling the drive unit to supply drive signals to the drive electrodes, programming for processing measurement signals from the sense unit, and other suitable programming, where appropriate. Although this disclosure describes a particular touch-sensor controller having a particular implementation with particular components, this disclosure contemplates any suitable touch-sensor controller having any suitable implementation with any suitable components.

Tracks 14 of conductive material disposed on the substrate of touch sensor 10 may couple the drive or sense electrodes of touch sensor 10 to connection pads 16, also disposed on the substrate of touch sensor 10. As described below, connection pads 16 facilitate coupling of tracks 14 to touch-sensor controller 12. Tracks 14 may extend into or around (e.g. at the edges of) the touch-sensitive area(s) of touch sensor 10. Particular tracks 14 may provide drive connections for coupling touch-sensor controller 12 to drive electrodes of touch sensor 10, through which the drive unit of touch-sensor controller 12 may supply drive signals to the drive electrodes. Other tracks 14 may provide sense connections for coupling touch-sensor controller 12 to sense electrodes of touch sensor 10, through which the sense unit of touch-sensor controller 12 may sense charge at the capacitive nodes of touch sensor 10. Tracks 14 may be made of fine lines of metal or other conductive material. As an example and not by way of limitation, the conductive material of tracks 14 may be copper or copper-based and have a width of approximately 100 μm or less. As another example, the conductive material of tracks 14 may be silver or silver-based and have a width of approximately 100 μm or less. In particular embodiments, tracks 14 may be made of ITO in whole or in part in addition or as an alternative to fine lines of metal or other conductive material. Although this disclosure describes particular tracks made of particular materials with particular widths, this disclosure contemplates any suitable tracks made of any suitable materials with any suitable widths. In addition to tracks 14, touch sensor 10 may include one or more ground lines terminating at a ground connector (which may be a connection pad 16) at an edge of the substrate of touch sensor 10 (similar to tracks 14).

Connection pads 16 may be located along one or more edges of the substrate, outside the touch-sensitive area(s) of touch sensor 10. As described above, touch-sensor controller 12 may be on an FPC. Connection pads 16 may be made of the same material as tracks 14 and may be bonded to the FPC using an anisotropic conductive film (ACF). Connection 18 may include conductive lines on the FPC coupling touch-sensor controller 12 to connection pads 16, in turn coupling touch-sensor controller 12 to tracks 14 and to the drive or sense electrodes of touch sensor 10. In another embodiment, connection pads 16 may be connected to an electro-mechanical connector (such as a zero insertion force wire-to-board connector); in this embodiment, connection 18 may not need to include an FPC. This disclosure contemplates any suitable connection 18 between touch-sensor controller 12 and touch sensor 10.

Figure 2:
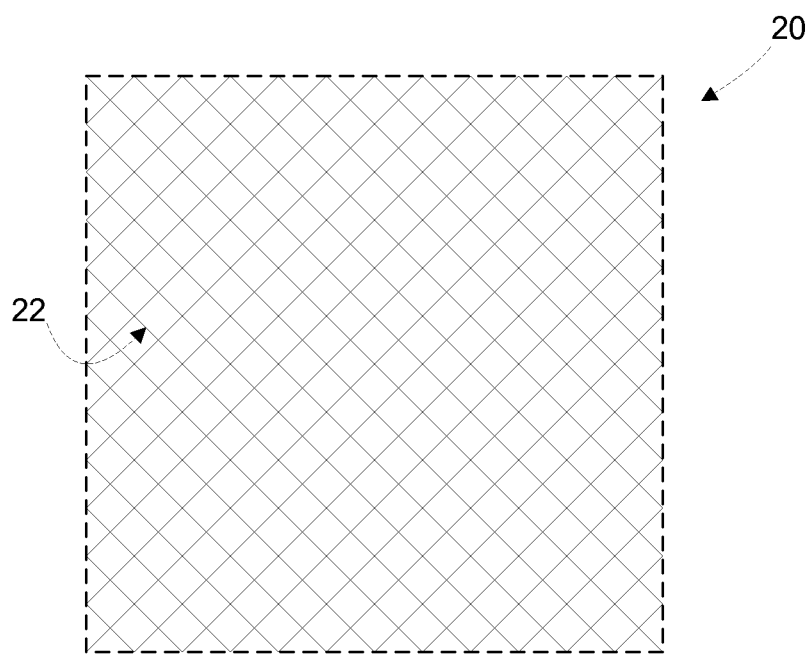
FIG. 2 illustrates an example mesh pattern.

FIG. 2 illustrates an example mesh pattern of a touch-sensitive layer. One or more cuts in the example mesh pattern 20 of FIG. 2 may (at least in part) form one or more shapes (e.g. electrode or fills) of the touch sensor, and the area of the shape may (at least in part) be bounded by those cuts. The example mesh pattern of FIG. 2 may be made from fine lines 22 of metal (e.g., gold, aluminum, copper, silver, or gold-, aluminum-, copper- or silver-based material or carbon nanotubes) or other conductive material. The conductive lines 22 of electrode may cause interference or moiré patterns since the conductive lines 22 may occlude light originating from a display situated below mesh pattern 20. Although this disclosure describes or illustrates conductive lines having a particular linearity, this disclosure contemplates conductive lines following any variation in line direction or path from a straight line, including, but not limited to, wavy, sinusoidal, or zig-zag lines. Moreover, although this disclosure describes or illustrates conductive lines formed using particular conductive materials, this disclosure contemplates conductive lines formed using any suitable conductive material, opaque or transparent.

One or more micro-features of the touch sensor may optically interfere with the viewing of one or more images by a display (such as for example a liquid crystal display (LCD)) underneath and visible through mesh pattern 20 of the touch sensor, as described below. Repeating patterns in the micro-features of the touch sensor may optically interfere with repeating pixel patterns or repeating patterns in an image on the display, resulting in one or more moiré patterns that may be visible to the user. As an example and not by way of limitation, conductive lines 22 that traverse along a same axis as an orthogonal pixel structure of the display may be more likely to produce moiré patterns depending on the configuration of the underlying display and a pitch of electrode lines. Therefore, even if electrode lines are formed from substantially transparent conductive material (e.g. ITO) and a width of conductive lines 22 is less than the width visually discernable by a user, one or more micro-features of the touch sensor may still affect its optical characteristics. Although this disclosure describes or illustrates a particular mesh pattern 20, this disclosure contemplates any suitable mesh pattern formed using any suitable conductive material having any suitable configuration. Fine lines 22 of conductive mesh pattern 20 may occupy the surface area of a shape in a hatched, mesh, or other suitable pattern. As an example and not by way of limitation, the fine lines 22 of conductive material may have a total line density of less than approximately 10% of a surface area. Thus, the contribution of the conductive lines to the attenuation of light through mesh pattern 20 may be within a range of approximately 1 to approximately 10%. Accordingly, although conductive lines 22 may be opaque, the combined optical transmittance of electrodes formed using mesh pattern 20 may be approximately 90% or higher, ignoring a reduction in transmittance due to other factors such as the substrate material.

Figure 3:
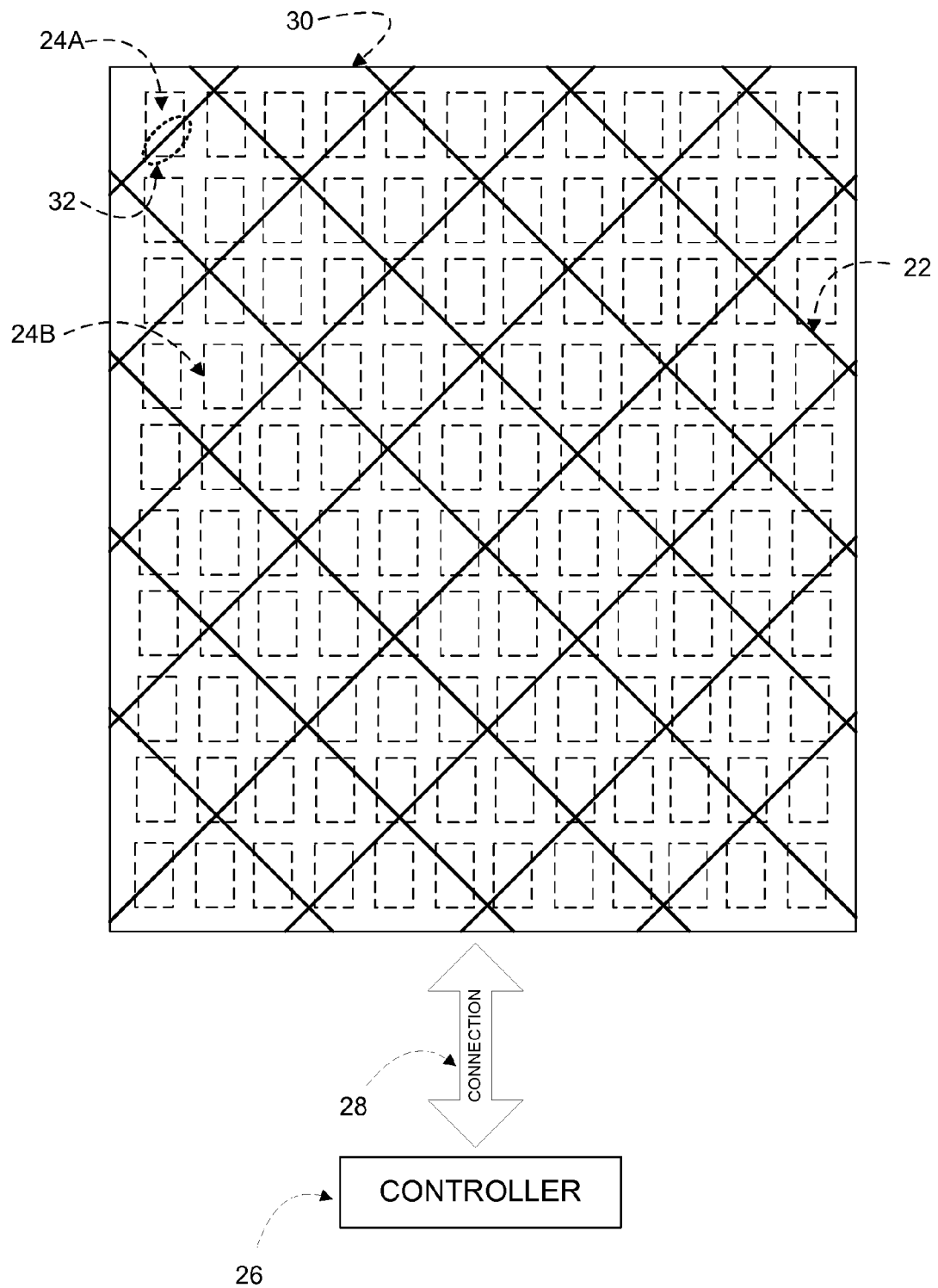
FIG. 3 illustrates an example plan views of example mesh pattern overlaid on a display.

FIG. 3 illustrates an example plan view of an example mesh overlaid on a display. In the example of FIG. 3, an example mesh of conductive lines 22 overlays a display 30. As an example and not by way of limitation, the display 30 underneath the touch sensor may be a liquid crystal display (LCD), a light-emitting diode (LED) display, a LED-backlight LCD, or other suitable display. Although this disclosure describes and illustrates a particular display and particular display types, this disclosure contemplates any suitable device display and any suitable display types. Display 30 includes an array of pixels 24A-B that each display at least a portion of an image that may be visible through the mesh of conductive lines 22. In particular embodiments, each pixel 24A-B of display 30 includes several pixel components, wherein each pixel component may correspond to a particular color, such as for example red, green, or blue. The combined output of the pixel components determines the color and intensity of each pixel 24A-B. Although this disclosure describes pixels having a particular number of pixel components and each pixel components having a particular color, this disclosure contemplates pixels having any suitable number of pixel components and each pixel component having any suitable color.

In particular embodiments display 30 may be coupled to a display controller 26 through connection 28. Display controller 26 may transmit signals to the array of pixels 24A-B to display an image. Display controller 26 may be one or more ICs, such as for example general-purpose microprocessors, microcontrollers, programmable logic devices or arrays, ASICs. In particular embodiments, display controller 26 comprises analog circuitry, digital logic, and digital non-volatile memory. Display controller 26 may include a processor unit, a drive unit, and a storage unit. The drive unit may transmit signals to display the image through the array of pixels 24A-B of display 30. The processor unit may control the transmission of signals to pixels 24A-B of display 30. The storage unit may store programming for execution by the processor unit, including programming for controlling the drive unit to transmit signals to the pixels 24A-B and other suitable programming, where appropriate. In particular embodiments, programming for controlling the drive unit may include a modification map providing output-modification values for pixels 24A-B to mitigate optical occlusion, as described below. Although this disclosure describes a particular display controller having particular functionality, this disclosure contemplates any suitable display controller having any suitable functionality. Moreover, this disclosure contemplates any suitable display controller having any suitable implementation with any suitable components.

Micro-features of the touch sensor may optically occlude one or more pixels 24A of display 30, as illustrated by region 32 of FIG. 3. As described above, micro-features of the touch sensor may include the conductive lines 22 of the mesh pattern. Optical occlusion of pixels 24A by conductive lines 22 may lead to light attenuation of the output of pixels 24A. In particular embodiments, occlusions may result from a single conductive line or from an intersection of multiple conductive lines. Light attenuation of the occluded pixels 24A may produce a visible contrast (e.g. in color or intensity) with non-occluded pixels 24B, thereby making at least a portion of the micro-features of the touch sensor visible. The contrast resulting from optical occlusion by micro-features of the touch sensor may be mitigated by modifying the relative output intensity or color between occluded pixels 24A and non-occluded pixels 24B. As an example and not by way of limitation, the output intensity of non-occluded pixels 24B or portions of non-occluded pixels 24B may be proportionally reduced relative to the output intensity of occluded pixels 24A. As another example, the output intensity of occluded pixels 24A or portion of occluded pixels 24A may be proportionally increased relative to non-occluded pixels 24B.

The position of the occluded pixels 24A may be determined based at least in part on the geometry of the mesh and the alignment of the mesh relative to display 30. In particular embodiments, after the touch sensor has been laminated to display 30 or assembly of the device is complete in applications with an air gap, a camera or vision system may be used to measure the relative position of the mesh to display 30 by detecting at least in part the relative rotation, alignment accuracy, etc. between the mesh and display 30. Moreover, locations of occlusions from a single conductive line and locations of occlusions from an intersection of two conductive lines may be determined and the output-modification values calculated for the particular type of occlusion. As an example and not by way of limitation, the occlusions may affect substantially an entire pixel 24A or be limited to one or more pixel components of pixel 24A and the output-modification values calculated to modify the output intensity of the one or more pixel components of the occluded pixels 24A or non-occluded pixels 24B. A color/intensity mask or modification map may be calculated based on the location of occluded pixels 24A and non-occluded pixels 24B or one or more pixel components of pixels 24A-B.

In particular embodiments, the modification map may include output-modification values to modify the output intensity or color of the array of pixels 24A-B, as described above. As an example and not by way of limitation, display 30 may be a 24-bit display with 8 bits allocated to determine the output intensity of each color (e.g. red, green, and blue), which results in $2^8$ or 256 output-intensity levels for each color. In particular embodiments, the output-modification values of the modification map may modify the bits associated with pixel components of pixels 24A-B. In particular embodiments, the modification map may be calculated without determining the location of the occluded pixels 24A. In other particular embodiments, the output-modification values of the modification map may substantially randomize the output intensity of each pixel 24A-B of display 30. As example and not by way of limitation, the randomization may have a variation of 4 output-intensity levels (i.e. light attenuation of approximately 2% for a 24-bit display) corresponding to the light attenuation of the mesh pattern. Randomization of the output intensity produces an optical white noise, thereby effectively camouflaging the micro-features of the touch sensor. In particular embodiments, randomization of the output intensity of pixels 24A-B may effectively obscure a mesh pattern that includes conductive lines 22 with substantially random paths, thereby obviating the requirement to determine the substantially random locations of occluded pixels 24A. Although this disclosure describes mitigating optical occlusion through adjustments of particular output characteristics, this disclosure contemplates adjustments of any suitable output characteristics.

In particular embodiments, the modification map provide output-modification values for each pixel 24A-B of display 30, where appropriate. Alternatively, where appropriate, the modification map may provide output-modification values for occluded pixels 24A of display 30, but not non-occluded pixels 24B or provide output-modification values for non-occluded pixels 24B of display 30, but not occluded pixels 24A, or any combination thereof. In particular embodiments, the modification map may be stored in the storage unit of display controller 30 or a shadow register of display 30. Alternatively, the modification map may be programmed in the display controller 30. The output modifications are applied to the output intensity of the pixels 24A-B in accordance with the modification map. In particular embodiments, applying the output modifications may be performed in software/hardware of display controller 26 or through pre-processing of the display data files. As an example and not by way of limitation, the output modifications are applied through pre-processing of the image displayed by display 30. As another example, the output-modification values of the modification map may be applied to the display data file through a logical operation, such as for example, logical AND or logical OR. The application of the output modifications modifies the color or intensity of pixels 24A-B accordingly, thereby mitigating the difference in intensity or color between occluded pixels 24A and non-occluded pixels 24B.

Figure 4:
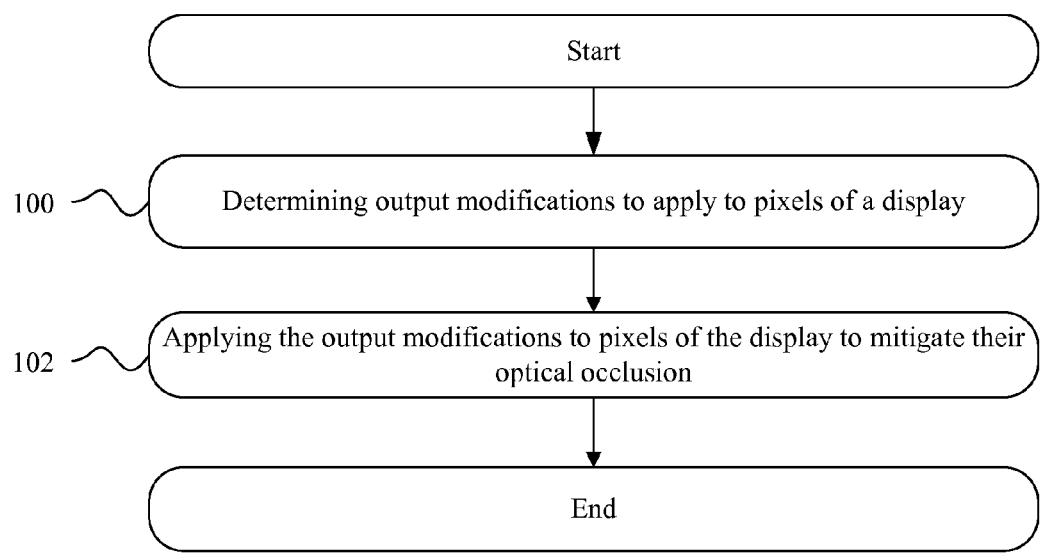
FIG. 4 illustrates an example method for mitigating pixel occlusion.

FIG. 4 illustrates an example method for mitigating pixel occlusion. The method may start at step 100, where output modifications applied to pixels of a display are determined based on a modification map for pixels of the display. In particular embodiments, the modification map provides output-modification values to mitigate optical occlusion of pixels of the display optically occluded by micro-features of a touch sensor relative to other pixels of the display not optically occluded by micro-features. Micro-features include lines of conductive material of a mesh and the touch sensor is positioned over the display. At step 102, the output modifications are applied to pixels of the display to mitigate their optical occlusion relative to other pixels of the display not optically occluded by micro-features of the touch sensor, at which point the method may end. In particular embodiments, the output modifications modify the relative output intensity or color between occluded pixels and non-occluded pixels. Although this disclosure describes and illustrates particular steps of the method of FIG. 4 as occurring in a particular order, this disclosure contemplates any suitable steps of the method of FIG. 4 occurring in any suitable order. Moreover, although this disclosure describes and illustrates particular components carrying out particular steps of the method of FIG. 4, this disclosure contemplates any suitable combination of any suitable components carrying out any suitable steps of the method of FIG. 4.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

This disclosure encompasses all changes, substitutions, variations, alterations, and modifications to the example embodiments herein that a person having ordinary skill in the art would comprehend. Moreover, although this disclosure describes and illustrates respective embodiments herein as including particular components, elements, functions, operations, or steps, any of these embodiments may include any combination or permutation of any of the components, elements, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A device comprising:
   a touch sensor comprising micro-features comprising lines of conductive material, the lines of conductive material comprising a mesh;
   a display comprising a plurality of pixels, the touch sensor overlaid on the display; and
   a computer-readable non-transitory storage medium coupled to the display and embodying logic that is configured when executed to:
      determine output modifications to apply to the pixels based on a modification map, the modification map providing output-modification values for the pixels to mitigate optical occlusion of pixels optically occluded by micro-features of the touch sensor relative to other pixels not optically occluded by micro-features of the touch sensor; and
      apply the output modifications to pixels to mitigate their optical occlusion relative to other pixels not optically occluded by micro-features of the touch sensor.

2. The device of claim 1, wherein the logic is further configured to increase an output intensity of the optically occluded pixels relative to an output intensity of the other pixels not optically occluded.

3. The device of claim 1, wherein is the logic further configured to decrease an output intensity of the other pixels not optically occluded relative to an output intensity of the optically occluded pixels.

4. The device of claim 1, wherein the modification map provides output-modification values that substantially randomizes an output intensity of the pixels, the randomization being proportional to a density of micro-features resulting in optical white noise being applied an output of the display.

5. The device of claim 1, wherein the logic is further configured to apply the modification map to an unmodified display-data file.

6. The device of claim 5, wherein the logic is further configure to perform a logical AND or logical OR operation between the modification map and the unmodified display-data file.

7. A method, executed by logic embodied in a computer-readable non-transitory medium, comprising:
   determining output modifications to apply to pixels of a display based on a modification map for pixels of the display, the modification map providing output-modification values for the pixels to mitigate optical occlusion of pixels of the display optically occluded by micro-features of a touch sensor overlying the display relative to other pixels of the display not optically occluded by micro-features of the touch sensor; and
   applying the output modifications to pixels of the display to mitigate their optical occlusion relative to other pixels of the display not optically occluded by micro-features of the touch sensor.

8. The method of claim 7, wherein micro-features comprising lines of conductive material comprising a mesh.

9. The method of claim 7, wherein providing output-modification values comprising increasing an output intensity of the optically occluded pixels relative to an output intensity of the other pixels not optically occluded.

10. The method of claim 7, wherein providing output-modification values comprising decreasing an output intensity of the other pixels not optically occluded relative to an output intensity of the optically occluded pixels.

11. The method of claim 7, wherein the modification map provides output-modification values that substantially randomizes an output intensity of the pixels, the randomization being proportional to a density of micro-features resulting in optical white noise being applied an output of the display.

12. The method of claim 7, wherein applying the output modifications comprising applying the modification map to an unmodified display-data file.

13. The method of claim 12, wherein applying the modification map comprising performing a logical AND or logical OR operation between the modification map and the unmodified display-data file.

14. A computer-readable non-transitory storage medium embodying logic configured when executed to:
 determine output modifications to apply to pixels of a display based on a modification map for pixels of the display, the modification map providing output-modification values for the pixels to mitigate optical occlusion of pixels of the display optically occluded by micro-features of a touch sensor overlying the display relative to other pixels of the display not optically occluded by micro-features of the touch sensor; and
 apply the output modifications to pixels of the display to mitigate their optical occlusion relative to other pixels of the display not optically occluded by micro-features of the touch sensor.

15. The medium of claim 14, wherein micro-features comprising lines of conductive material comprising a mesh.

16. The medium of claim 14, wherein the logic is further configured to increase an output intensity of the optically occluded pixels relative to an output intensity of the other pixels not optically occluded.

17. The medium of claim 14, wherein is the logic further configured to decrease an output intensity of the other pixels not optically occluded relative to an output intensity of the optically occluded pixels.

18. The medium of claim 14, wherein the modification map provides output-modification values that substantially randomizes an output intensity of the pixels, the randomization being proportional to a density of micro-features resulting in optical white noise being applied an output of the display.

19. The medium of claim 14, wherein the logic is further configured to apply the modification map to an unmodified display-data file.

20. The medium of claim 19, wherein the logic is further configured to perform a logical AND or logical OR operation between the modification map and the unmodified display-data file.

* * * * *